(12) United States Patent
Herman et al.

(10) Patent No.: US 6,485,042 B1
(45) Date of Patent: Nov. 26, 2002

(54) INTEGRATED ROTARY DRIVE MOTION TRANSMISSION AND DIRECTIONAL CONTROL SYSTEM

(76) Inventors: Bradford K. Herman, 4001 Cedar Lake Rd., Goddard, KS (US) 67052; Douglas S. Queen, 730 Carriage Rd., Maize, KS (US) 67101

( * ) Notice: Subject to any disclaimer, the term of this patent is extended or adjusted under 35 U.S.C. 154(b) by 0 days.

(21) Appl. No.: 09/862,684

(22) Filed: May 21, 2001

(51) Int. Cl.$^7$ .................................................. B62M 9/00
(52) U.S. Cl. ............................................................ 280/236
(58) Field of Search ............................... 280/828, 236, 280/237, 238, 260, 261; 74/352, 354, 404, 594.1, 594.2, 594.3

(56) References Cited

U.S. PATENT DOCUMENTS

| | | | | |
|---|---|---|---|---|
| 601,205 A | * | 3/1898 | Hill | 180/293 |
| 967,384 A | * | 8/1910 | Huther | 74/404 |
| 1,352,315 A | | 9/1920 | Rimailho | |
| 1,376,347 A | | 4/1921 | McComb | |
| 2,289,331 A | | 7/1942 | Alt | 280/1.11 |
| 2,305,072 A | | 12/1942 | Fetters | 280/211 |
| 2,633,370 A | | 3/1953 | Johnston et al. | 280/211 |
| 3,183,020 A | | 5/1965 | Hawver | 280/208 |
| 3,332,703 A | | 7/1967 | Evans | 280/211 |
| 3,712,397 A | * | 1/1973 | Smith et al. | 180/6.2 |
| 3,913,410 A | * | 10/1975 | Ackerman | 474/138 |
| 4,117,739 A | * | 10/1978 | Meier et al. | 74/404 |
| 4,309,043 A | * | 1/1982 | Brown | 280/236 |
| 4,484,646 A | | 11/1984 | Smith | 180/6.2 |
| 4,667,975 A | | 5/1987 | Fabiano | 280/211 |
| 4,790,546 A | | 12/1988 | Mendenhall | 280/1.11 R |
| 5,029,486 A | * | 7/1991 | Mercat | 280/236 |
| 5,823,554 A | * | 10/1998 | Lau | 280/231 |
| 5,826,897 A | * | 10/1998 | Beard | 280/217 |
| 6,383,108 B1 | * | 5/2002 | Yoo | 280/236 |

FOREIGN PATENT DOCUMENTS

JP  01261534 A  * 10/1989  ............. F16H/1/28

* cited by examiner

*Primary Examiner*—Kevin Hurley
*Assistant Examiner*—Paul Royal, Jr.
(74) *Attorney, Agent, or Firm*—Flanagan & Flanagan; John R. Flanagan (57) ABSTRACT

An integrated rotary drive motion transmission and directional control system includes a rotor and a pair of rotary drive motion transmitting assemblies each disposed adjacent to one of the opposite sides of the rotor. The rotor is mounted to rotate in either of opposite directions and has an annular channel defined on each opposite side by radially spaced inner and outer concentric surfaces. Each assembly is mounted to rotate in either opposite direction and has output and input elements disposed respectively remotely from and adjacent to the rotor. The input element can be moved from an intermediate neutral position to one of opposite drive positions where the input element engages one or the other of the inner and outer surfaces of the rotor annular channel enabling transmitting of rotary drive motion from the rotor to the assembly output element and controlling speed and direction thereof.

24 Claims, 8 Drawing Sheets

INTEGRATED ROTARY DRIVE MOTION TRANSMISSION AND DIRECTIONAL CONTROL SYSTEM

BACKGROUND OF THE INVENTION

1. Field of the Invention

The present invention generally relates to drive systems for controlling transmission of rotary drive motion, such as for tracked wheels of an occupant-propelled toy vehicle, and, more particularly, is concerned with an integrated rotary drive motion transmission and directional control system, such as for such toy vehicles.

2. Description of the Prior Art

A variety of different drive systems for controlling the transmission of rotary drive motion to tracked wheels of occupant-propelled toy vehicles are disclosed in the prior art. Representative of the prior art patents disclosing such drive systems are U.S. Pat. No. 1,376,347 to McComb, U.S. Pat. No. 2,289,331 to Alt, U.S. Pat. No. 2,305,072 to Fetters, U.S. Pat. No. 2,633,370 to Johnston et al, U.S. Pat. No. 3,332,703 to Evans and U.S. Pat. No. 4,790,546. The drive systems of some of these patents appear too complex and complicated for a young child of average strength to be able to manually operate the drive systems. The drive systems of other of these patents appear to only simulate the operation of a tracked wheel vehicle. While these prior art drive systems may operate satisfactorily under the limited conditions for which they were designed, none of these drive systems appear to approach an optimum arrangement of components for enabling a young child to effectively propel and operate a tracked toy vehicle.

Consequently, a need still exists for an innovation which will overcome the problems of prior art drive systems without introducing any new problems in place thereof.

SUMMARY OF THE INVENTION

The present invention provides an integrated rotary drive motion transmission and directional control system designed to satisfy the aforementioned need. The system of the present invention utilizes a relatively limited number of simple, uncomplicated components which can be operated by a young child to carry out both rotary drive motion transmission and rotary drive motion directional control functions.

Accordingly, the present invention is directed to an integrated rotary drive motion transmission and directional control system which comprises: (a) a rotor mounted to rotate in either first or second opposite directions and having a pair of annular channels each defined on one of a pair of opposite sides of the rotor by a pair of radially spaced inner and outer concentric surfaces; and (b) a pair of rotary drive motion transmitting assemblies each mounted to rotate and disposed adjacent to one of the opposite sides of the rotor, each of the rotary drive motion transmitting assemblies having an output element disposed remotely from the rotor and an input element disposed adjacent to the rotor, the input element adapted to be moved from an intermediate neutral position to one of a pair of opposite drive positions where the input element engages one or the other of the inner and outer surfaces of the annular channel on the rotor enabling transmitting of rotary drive motion from the rotor to the output element of the one of the rotary drive motion transmitting assemblies and also enabling controlling the speed and direction of the transmitted rotary drive motion.

Also, the present invention is directed to an integrated rotary drive motion transmission and directional control system which comprises: (a) a support structure; (b) a pair of driven output mechanisms mounted to the support structure for receiving rotary drive motion; (c) a rotor mounted to the support structure to rotate in either one of first and second opposite directions and disposed between and spaced from the driven output mechanisms, the rotor having a pair of opposite sides and a pair of annular channels, each of the annular channels being defined on one of the opposite sides of the rotor and having opposing inner and outer concentric surfaces radially spaced from one another such that the outer surface has a diameter larger than a diameter of the inner surface; (d) a drive input mechanism mounted to the support structure for transmitting rotary drive motion to the rotor so as to cause the rotor to rotate in either one of the first and second opposite directions; (e) a pair of rotary drive motion transmitting assemblies mounted to the support structure to rotate in either one of the first and second opposite directions and disposed in a transverse relationship to and extending between the rotor and the driven output mechanisms, each of the rotary drive motion transmitting assemblies having an output element disposed at and drivingly coupled with one of the driven output mechanisms and an input element disposed at one of the opposite sides of the rotor and adapted to be moved to one of a pair of displaced drive positions wherein the input element engages one of the concentric surfaces and is disengaged from the other of the concentric surfaces of one of the annular channels so as to enable transmitting of the rotary drive motion from the drive input mechanism to the driven output mechanisms via the rotor and rotary drive motion transmitting assemblies and also determine speed and direction of the transmitted rotary drive motion, the input element also adapted to be moved to an intermediate neutral position located between the displaced drive positions in which the input element is disposed between and spaced from the inner and outer concentric surfaces of the one of the annular channels of the rotor so as to disable the transmitting of the rotary drive motion from the drive input mechanism to the driven output mechanisms via the rotor and rotary drive motion transmitting assemblies; and (f) means mounted to the support structure for controlling movement of the input element of the rotary drive motion transmitting assemblies independently of one another between the displaced drive positions and the intermediate neutral position.

Further, the present invention is directed to a bi-lateral track drive vehicle employing the above-described integrated rotary drive motion transmission and directional control system.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Referring to the drawings and particularly to FIGS. 1 to 4, there is illustrated a bi-lateral track drive vehicle, generally designated 10, which employs the integrated drive transmission system of the present invention, generally designated 12. Although the integrated drive transmission system 12 of the present invention in an exemplary embodiment thereof is shown implemented in a vehicle 10 that is a toy, it will be readily understood that the potential applications for the integrated drive transmission system 12 are not so limited.

Referring to FIGS. 1 to 4 and 10 to 12, the bi-lateral track drive vehicle 10 basically includes a frame or support structure in the form of a chassis 14 having a rear seat 16 for a driver, and a pair of driven output mechanisms which, in the exemplary embodiment, are in the form of bi-lateral drive traction mechanisms 18 respectively movably supported along opposite lateral sides of the chassis 14 for receiving rotary drive motion from the integrated drive transmission system 12 of the vehicle 10.

Figure 11:
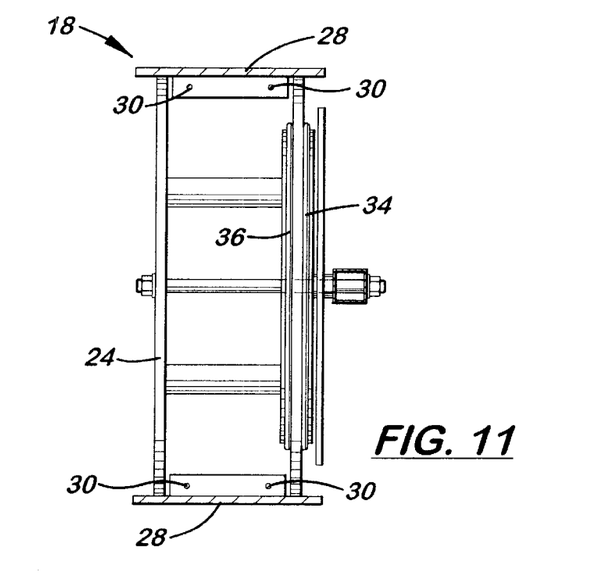
FIG. 11 is an enlarged cross-sectional view taken along line 11—11 of FIG. 10 showing the center wheel.
Figure 12:
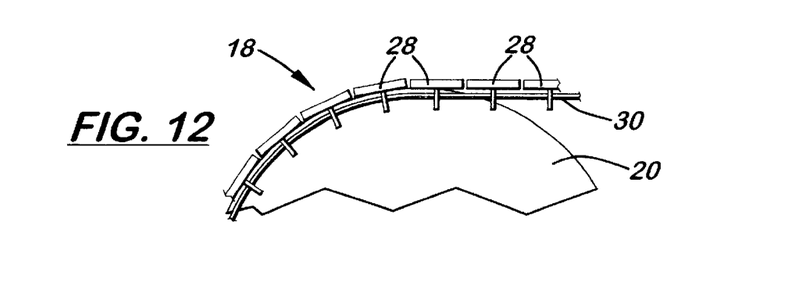
FIG. 12 is an enlarged fragmentary side elevational view of the front wheel and endless flexible track entrained thereover along one side of the vehicle as seen along line 12—12 of FIG. 3.

Each bi-lateral drive traction mechanism 18 of the vehicle 10 includes a set of front, rear and center wheels 20, 22, 24, and an endless track 26 entrained about the set of wheels 20–24. The wheels 20–24 of the set of each drive traction mechanism 18 are rotatably mounted to one of the opposite lateral sides of the chassis 14 such that the wheels 20–24 of each set are spaced apart from and aligned with one another and aligned across from the wheels 20–24 of the opposite set. The endless track 26 of each drive traction mechanism 18 includes a plurality of cleats 28 arranged in an endless row, and at least one and preferably a pair of laterally spaced apart endless elastic members 30 extending through the cleats 28, as seen in FIGS. 11 and 12, so as to hold the cleats 28 together and thereby form the endless track 26 while at the same time permitting stretching of the elastic members 30 and thus separation of the cleats 28 from one another so as to prevent accidental pinching of a finger or other body part of a user of the vehicle 10.

Figure 10:
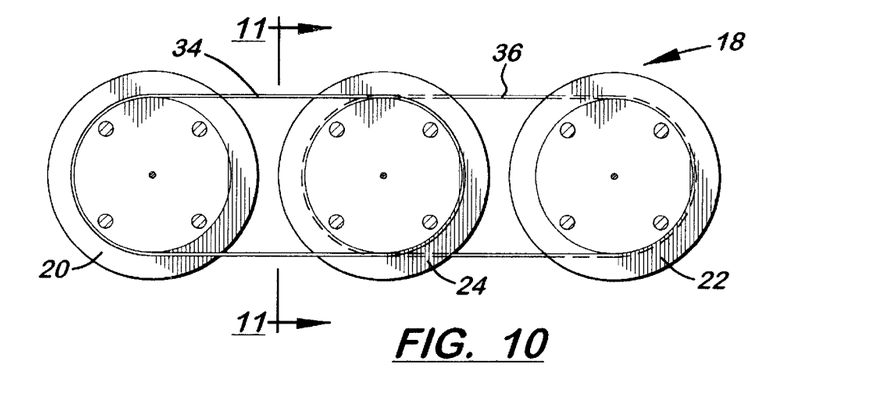
FIG. 10 is an enlarged longitudinal sectional view taken along line 10—10 of FIG. 3 showing front, rear and center track wheels rotatably mounted in a spaced apart relationship from one another along one of the opposite sides of the vehicle and a pair of endless flexible members separately coupling the front and rear wheels with the center wheel so as to provide all wheel drive of the vehicle.

The drive traction mechanisms 18 of the vehicle 10 also include respective annular driven elements 32 aligned with one another and mounted at inner sides of a corresponding one pair of the wheels 20–24 of the sets thereof at the opposite lateral sides of the chassis 12. In the exemplary embodiment of FIGS. 1–5, the corresponding wheels of the sets thereof which mount the annular driven elements 32 are the center wheels 24 of the drive traction mechanisms 18. As seen in FIGS. 10 and 11, each drive traction mechanism 18 further includes a pair of endless flexible members 34, 36, such as each in the form of a rope, separately drivingly coupling the front and rear wheels 20, 22 of the respective set thereof with the center wheel 24 of the set so as to provide "all wheel" drive for the vehicle 10. The rotary motion of the one positively driven center wheel 24 of each set is thereby transmitted to the other front and rear wheels 20, 22 by the endless flexible members 34, 36 which are associated with that particular set.

Referring to FIGS. 2 to 9, the integrated drive transmission system 12 of the present invention basically includes a rotor 38 mounted to the chassis 14 at a forward central location for undergoing rotation in either one of clockwise and counterclockwise, or opposite, directions and being disposed between and spaced from the drive traction mechanisms 18, and a pair of rotary drive motion transmitting assemblies 40 each mounted to the chassis 14 also for undergoing rotation in either one of the same opposite directions as the rotor 38 and being disposed in a transverse relationship to and extending between the rotor 38 and the drive traction mechanisms 18. The rotor 38 of the system 12 has a generally circular configuration, a continuous circumferential groove 42, a pair of opposite sides 38A, and a pair of annular channels 44 each defined on one of the opposite sides 38A of the rotor 38. Each channel 44 has a pair of opposing inner and outer concentric walls or surfaces 46, 48 being radially spaced from one another such that the outer surface 48 has a diameter larger than a diameter of the inner surface 46.

Each rotary drive motion transmitting assembly 40 of the system 12 includes a cross shaft 50 mounted for undergoing rotation in either one of the opposite directions and having opposite input and output ends 50A, 50B, and input and output elements 52, 54 respectively mounted to the cross shaft 50 at the opposite input and output ends 50A, 50B thereof so as to undergo rotation with the cross shaft 50. Each assembly 40 further includes a spherical bearing 56 mounted to the chassis 14 adjacent to the outer end 50B of the cross shaft 50 so as to rotatably and pivotally support the cross shaft 50 and thus allow pivotal movement of the cross shaft 50 relative to the spherical bearing 56 and thereby allow movement of the input element 52 relative to the rotor 38. The output element 54 of each assembly 40 is coupled to the annular driven element 32 of one of the drive traction mechanisms 18.

Figure 1:
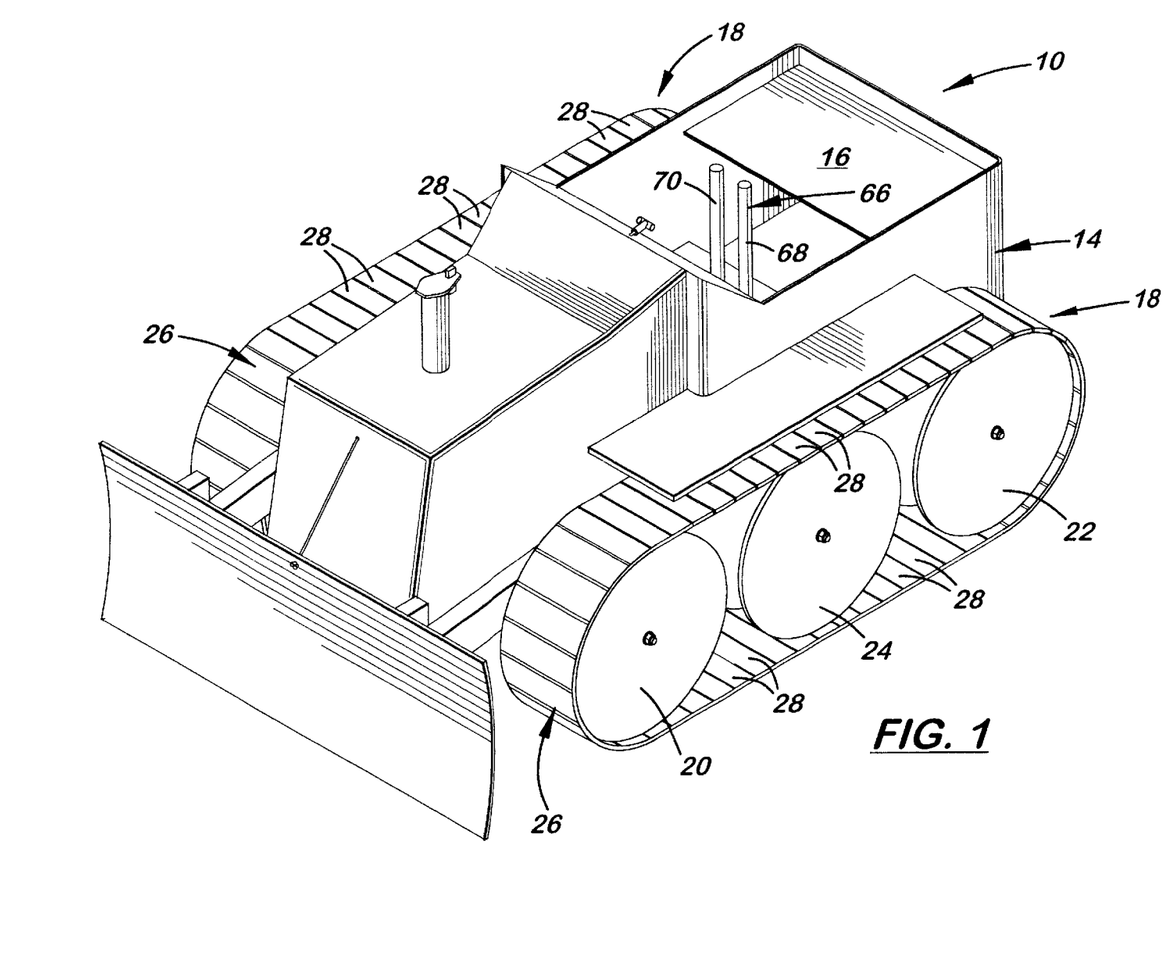
FIG. 1 is a perspective view of a bi-lateral track drive vehicle incorporating an integrated rotary drive motion transmission and directional control system of the present invention, hereinafter for the sake of brevity being referred to as the "integrated drive transmission system".
Figure 2:
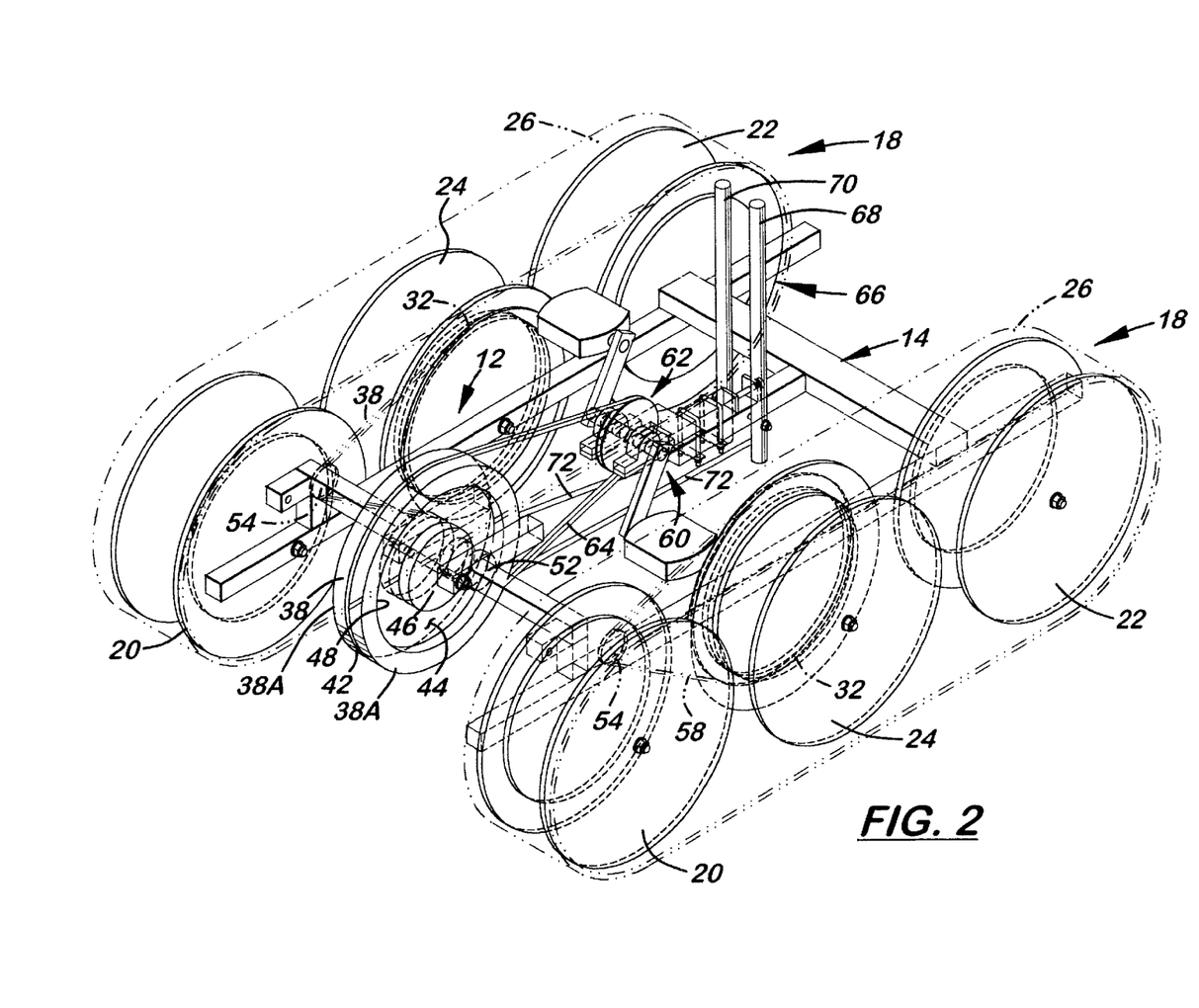
FIG. 2 is a perspective view of the integrated drive transmission system of present invention employed by the vehicle of FIG. 1.
Figure 3:
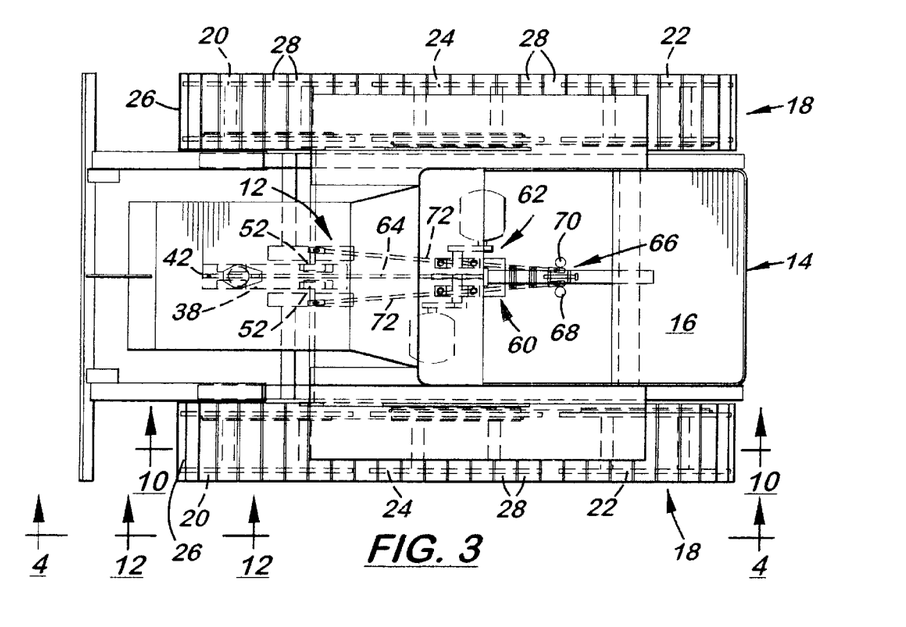
FIG. 3 is a top plan view on a reduced scale of the vehicle of FIG. 1 showing in dashed line form the integrated drive transmission system of FIG. 2.
Figure 3A:
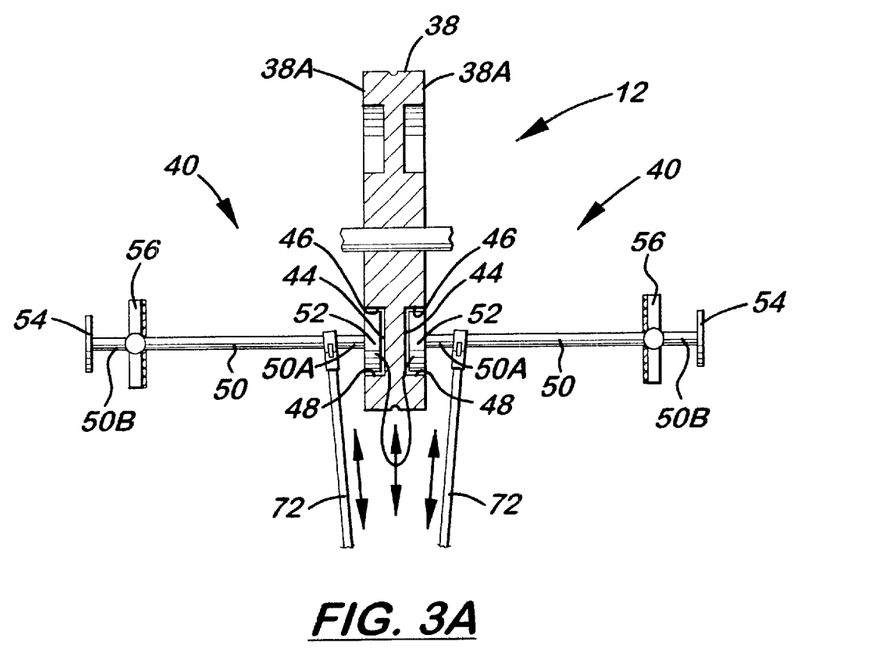
FIG. 3A is an enlarged fragmentary view of the integrated drive transmission system as seen along line 3A—3A of FIG. 3.
Figure 4:
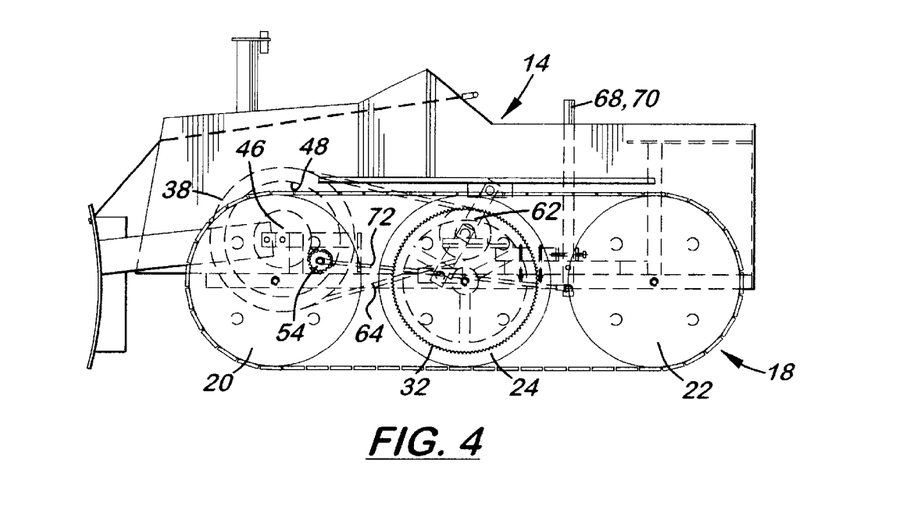
FIG. 4 is a side elevational view of the vehicle as seen along line 4—4 of FIG. 3 showing in dashed line form the integrated drive transmission system.
Figure 5:
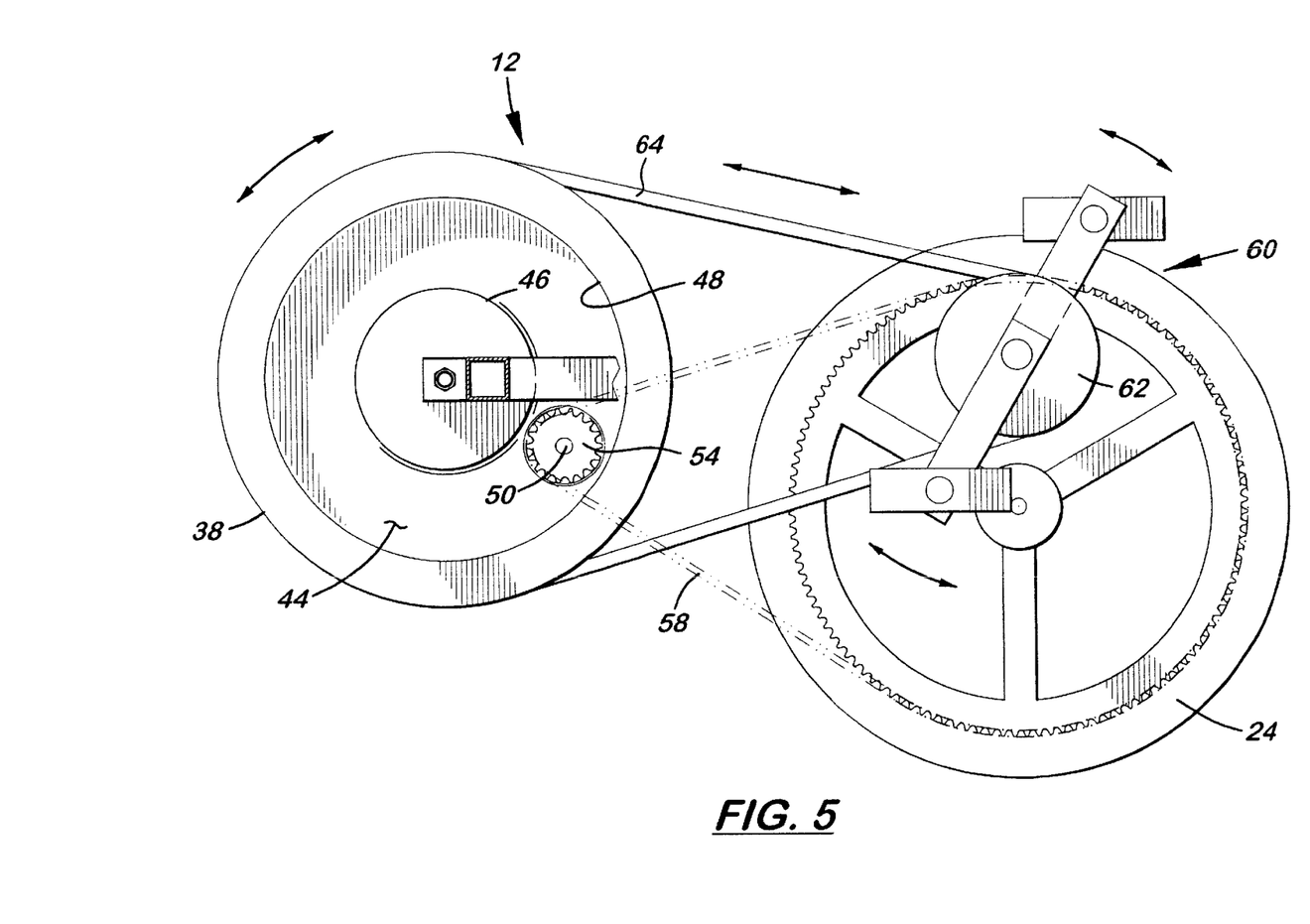
FIG. 5 is an enlarged fragmentary view of the integrated drive transmission system which was shown in dashed line form in FIG. 4.

Thus, as seen in FIG. 3A, the input element 52 of each of the assemblies 40 is disposed at one of the opposite sides 38A of the rotor 38 and adapted to be moved, by the pivotal or swinging movement of the respective cross shaft 50 about the corresponding spherical bearing 56, to one of a pair of oppositely displaced drive positions wherein the input element 52 engages one of the inner and outer concentric surfaces 46, 48 of the annular channel 44 and is disengaged from the other of the inner and outer concentric surfaces 46, 48 of the annular channel 44. Engagement of the input element 52 with either of the concentric surfaces 46, 48 will enable transmission of rotary drive motion from the rotor 38 to the respective one of the drive traction mechanisms 18 and also determine the speed and direction of the rotary drive motion. The input element 52 of each of the assemblies 40 is also adapted to be moved to an intermediate neutral position located between the opposite displaced drive positions in which the input element 52 is disposed between and spaced and thus disengaged from both the inner and outer concentric surfaces 46, 48 of the respective annular channel 44 of the rotor 38 so as to disable the transmission of the rotary drive motion from the rotor 38 to the respective drive traction mechanism 18.

In the illustrated embodiment, the input element 52 of each assembly 40 is a roller which makes frictional engagement with the concentric surfaces 46, 48 of the respective annular groove 44. Other types of input elements can be employed such as meshing gears. The output element 54 of each assembly can be a small sprocket and the annular driven element 32 of each drive traction mechanism 18 can be a large sprocket drivingly coupled to the small sprocket by an endless drive chain 58. Thus, the center wheels 24 can have the large sprockets 54 mounted thereto at their inner sides and drivingly coupled by endless chains 58 to the small sprockets 52 on the outer ends 50B of the cross shafts 50 which extend transversely between the center wheels 24 and the opposite sides 38A of the rotor 38.

Figure 13:
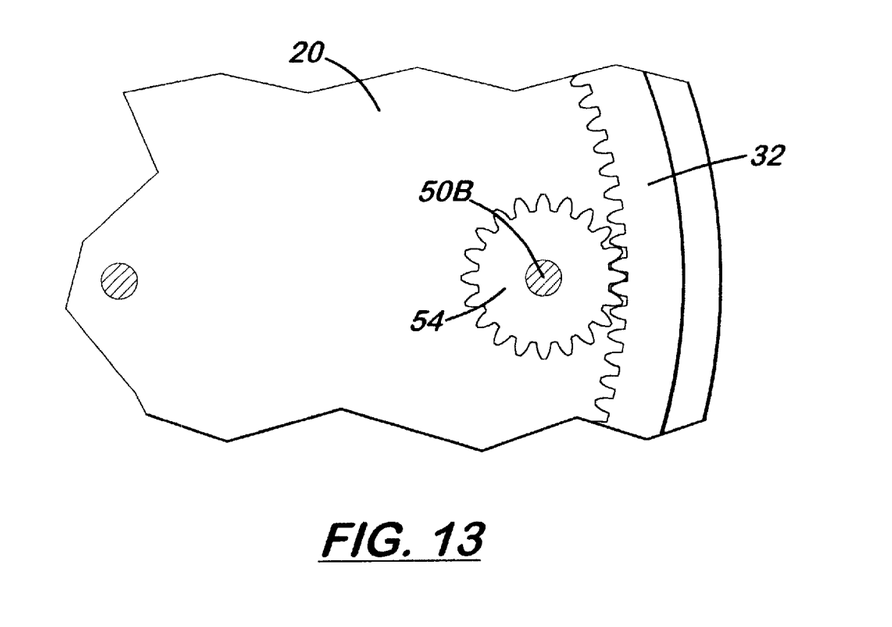
FIG. 13 is an enlarged fragmentary view of an alternative embodiment of the integrated drive transmission system wherein drive coupling is provided by meshing gears mounted on the inner sides of the front wheels and the outer ends of cross shafts of the rotary drive transmission assemblies.

Alternatively, as seen in FIG. 13, the output element 54 of each assembly 40 can be a small spur gear and the annular driven element of each drive traction mechanism 18 can be a large spur gear mounted to the inner side of one of the front wheels 20 which drivingly mesh directly with the small spur gear. Thus, in the alternative embodiment the drive traction mechanisms 18 are driven at the front wheels 20 instead of the middle or center wheels 24. This alternative embodiment eliminates the large sprockets 54 on the center wheels 24, the small sprockets 52 on the cross shafts 50, and the endless chains 58 that couple them to one another. The front wheels 20 are driven directly by the cross shafts 50 via the meshing spur gears 52, 54.

The integrated drive transmission system also includes a drive input mechanism 60 operable for transmitting rotary drive motion to the rotor 38 so as to cause the rotor 38 to rotate in either one of the opposite directions. In the illustrated exemplary embodiment, the drive input mechanism 60 includes a set of rotary pedals 62 and a motion transmitting member 64. The set of rotary pedals 62 is rotatably mounted on the chassis 14 at a location rearwardly of the rotor 38 and forwardly of the rear seat 16. The set of pedals 62 is adapted to be manually rotated by the user or driver so as to generate the desired rotary drive motion in either one of the opposite directions. The motion transmitting member 64 in the illustrated exemplary embodiment is an endless belt (or chain) extending between and drivingly coupled over the rotor 38 via the circumferential groove 42 therein and the set of rotary pedals 62 for transmitting the rotary drive motion of the set of rotary pedals 62 to the rotor 38.

The integrated drive transmission system 12 further includes means 66 for controlling movement of the input elements 52 of the rotary drive motion transmitting assemblies 40 independently of one another between the oppositely displaced drive positions and the neutral position. In the exemplary embodiment, the movement controlling means 66 is a pair of hand-operated levers 68, 70 pivotally mounted to the chassis 14 forwardly of the rear seat 16 and adjacent to the set of pedals 62. Each of the levers 68, 70 is independently movable between forward and rearward positions and an intermediate neutral position therebetween and is linked by an elongated rod 72 to the cross shaft 50 of a respective one of the rotary drive motion transmitting assemblies 40 nearer to the input element 52 than to the output element 54 thereof. Movement of each of the levers 68, 70 pivotally or swingably moves the cross shaft 50 of the corresponding one of the assemblies 40 and shifts the input element 52 of the assembly 40 correspondingly between the oppositely displaced drive positions and-the intermediate neutral position relative to the inner and outer concentric surfaces 46, 48 of the respective channel 44 on the rotor 38. While in the exemplary embodiment, a friction-type input drive mechanism 60 and a pair of manually operated levers 68, 70 are utilized, the drive input mechanism 60 can alteratively be a gear type and other sources of input power as well as other methods of direction control can be employed.

Figure 6:
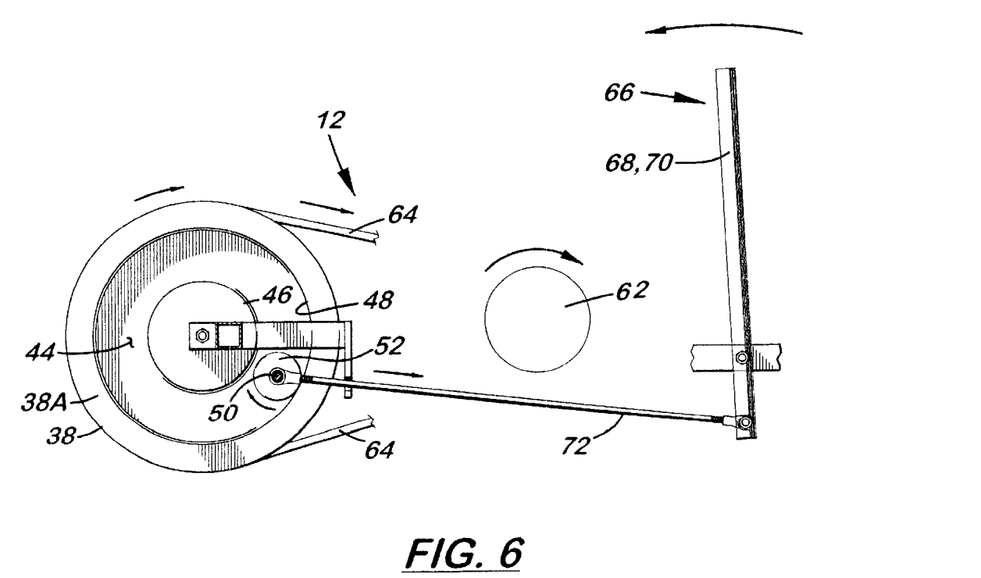
FIGS. 6 to 9 are diagrammatic views of the integrated drive transmission system showing the directions of rotation of various components thereof for respectively producing rotary motion at low speed in the backward direction, rotary motion at low speed in the forward direction, rotary motion at high speed in the backward direction and rotary motion at high speed in the forward direction.
Figure 7:
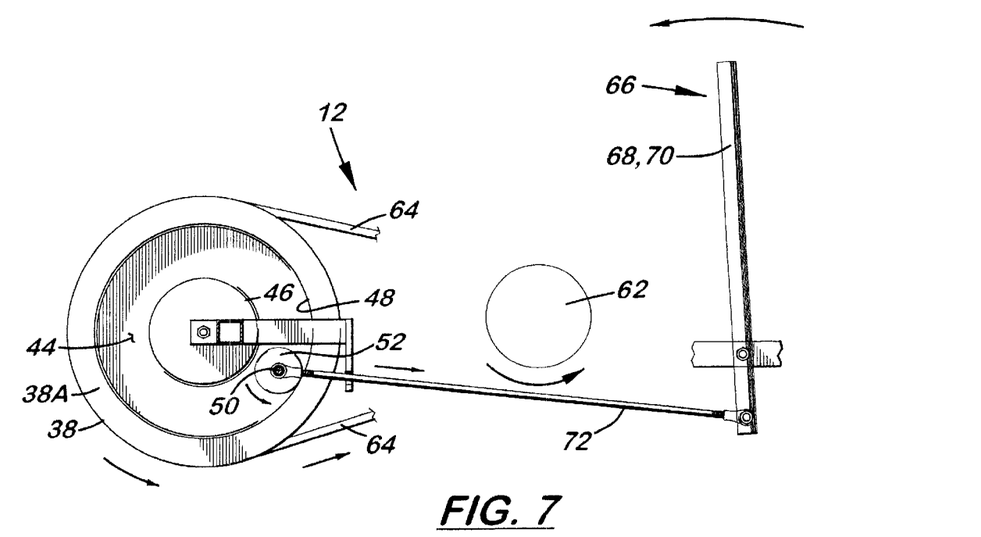
Figure 8:
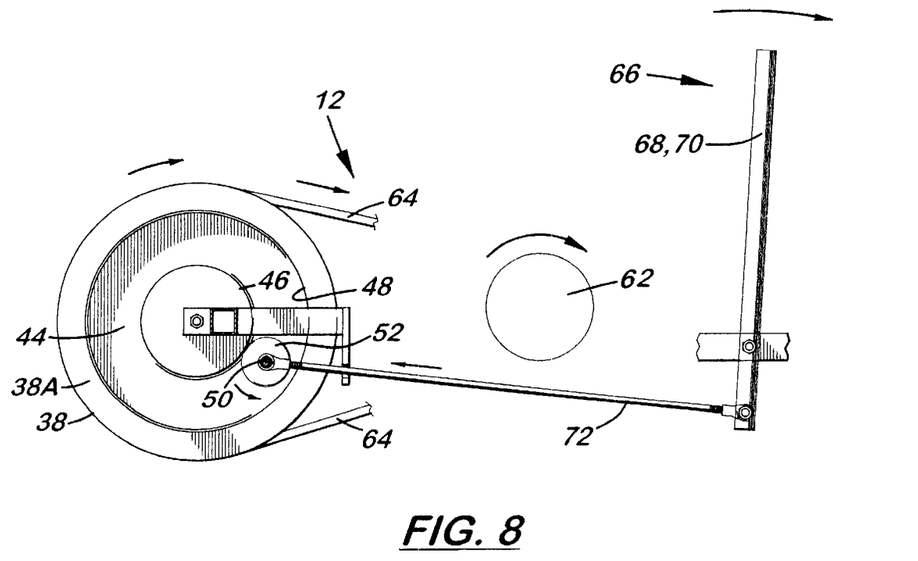
Figure 9:
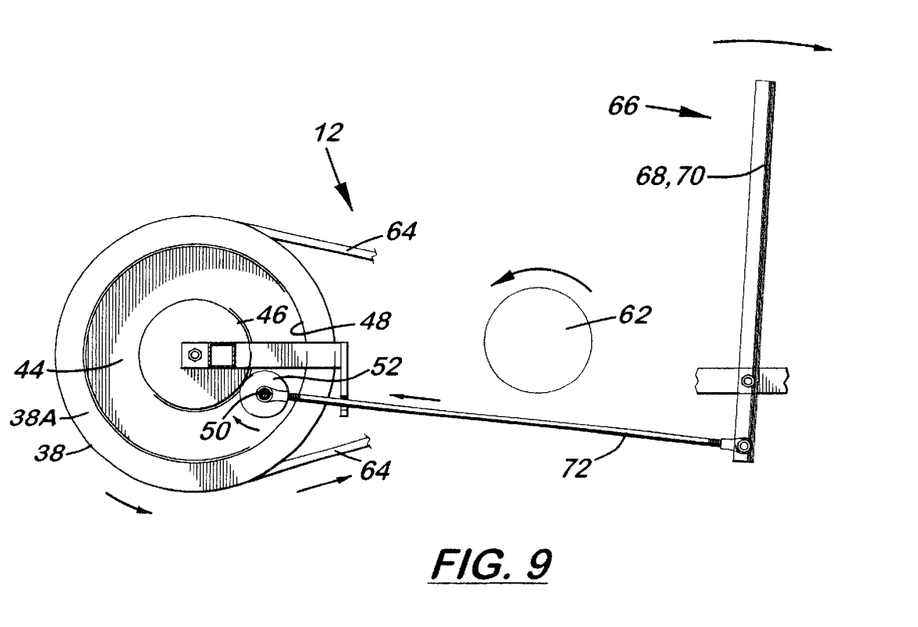

At the intermediate neutral positions of the levers 68, 70, the input elements 52 of the assemblies 40 do not contact either of the inner and outer concentric surfaces 46, 48 of the respective grooves 44 on the rotor 38 so that rotation of the set of pedals 62 in either direction does not cause transmission of the rotary drive motion to the drive traction mechanisms 18. As seen in FIG. 6, movement of each of the levers 68, 70 to the forward position, shifts the input element 42 of the corresponding one of the rotary drive motion transmitting assemblies 40 into engagement with the outer concentric surface 48 of the corresponding one of the channels 44 on the rotor 38 so that pedaling rotation of the set of pedals 62 in the clockwise or rearward direction causes the transmission of rotary drive motion at a higher gear ratio in the direction of the pedaling rotation which results in movement of the vehicle 10 in a backing or reverse direction at the higher gear ratio or slower speed. On the other hand, as seen in FIG. 7, with the levers 68, 70 moved to the forward position, the pedaling rotation of the set of pedals 62 in the opposite, counterclockwise or forward direction causes the transmission of rotary drive motion at the higher gear ratio in the direction of the pedaling rotation which results in movement of the vehicle 10 in the forward direction at the higher gear ratio or slower speed. Now, as seen in FIG. 8, movement of each of the levers 68, 70 to the rearward position, shifts the input element 42 of the corresponding one of the rotary drive motion transmitting assemblies 40 into engagement with the inner concentric surface 46 of the corresponding one of the channels 44 on the rotor 38 so that pedaling rotation of the set of pedals 62 in the clockwise or rearward direction causes the transmission of rotary drive motion at a lower gear ratio in the direction of the pedaling rotation which results in movement of the vehicle 10 in the backing or rearward direction at the lower gear ratio or faster speed. On the other hand, as seen in FIG. 9, with the levers 68, 70 moved to the rearward position, the pedaling rotation of the set of pedals 62 in the counterclockwise or forward direction causes the transmission of rotary drive motion at the lower gear ratio in the direction of the pedaling rotation which results in movement of the vehicle 10 in the forward direction at the lower gear ratio or faster speed. Also, differential movement of the levers 68, 70 relative to one another produces turning in either direction based on the respective relative positions of the levers 68,70 and the direction of pedaling rotation of the set of pedals 62.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An integrated rotary drive motion transmission and directional control system, comprising:

(a) a rotor mounted to rotate in either one of first and second opposite directions and having a pair of annular channels each defined on one of a pair of opposite sides of said rotor by a pair of radially spaced inner and outer concentric surfaces; and (b) a pair of rotary drive motion transmitting assemblies each mounted to rotate and disposed adjacent to one of said pair of opposite sides of said rotor and having an output element disposed remotely from said rotor and an input element disposed adjacent to rotor, said input element adapted to be moved from an intermediate neutral position to one of a pair of opposite drive positions where said input element engages one or the other of said inner and outer surfaces of said annular channel on said rotor enabling transmitting of rotary drive motion from said rotor to said output element of said one of said rotary drive motion transmitting assemblies and also enabling controlling the speed and direction of the transmitted rotary drive motion.

2. The system of claim 1 wherein each of said rotary drive motion transmitting assemblies further has a cross shaft mounted to rotate in either one of said first and second opposite directions and having opposite ends with said output and input elements mounted to said cross shaft at said respective opposite ends thereof for undergoing rotation with said cross shaft.

3. The system of claim 1 wherein each of said rotary drive motion transmitting assemblies further has a spherical bearing being mounted to rotatably and pivotally support said cross shaft adjacent to said outer end thereof so as to allow pivotal movement of said cross shaft relative to said spherical bearing and thereby movement of said inner element relative to said rotor between said opposite drive positions.

4. The system of claim 1 wherein said input element of each of said rotary drive motion transmitting assemblies is a roller for making frictional engagement with said surfaces of said annular groove.

5. An integrated rotary drive motion transmission and directional control system, comprising:

(a) a support structure;

(b) a pair of driven rotary motion output mechanisms mounted to said support structure for receiving rotary drive motion;

(c) a rotor mounted to said support structure to rotate in either one of first and second opposite directions and disposed between and spaced from said driven output mechanisms, said rotor having a pair of opposite sides and a pair of annular channels, each of said annular channels being defined on one of said opposite sides of said rotor and having opposing inner and outer concentric surfaces radially spaced from one another such that said outer surface has a diameter larger than a diameter of said inner surface;

(d) a drive input mechanism mounted to said support structure for transmitting rotary drive motion to said rotor so as to cause said rotor to rotate in either one of said first and second opposite directions;

(e) a pair of rotary drive motion transmitting assemblies mounted to said support structure to rotate in either one of said first and second opposite directions and disposed in a transverse relationship to and extending between said rotor and said driven output mechanisms, each of said rotary drive motion transmitting assemblies having an output element disposed at and drivingly coupled with one of said driven output mechanisms and an input element disposed at one of said opposite sides of said rotor and adapted to be moved to one of a pair of displaced drive positions wherein said input element is engaged with one of said concentric surfaces and disengaged from the other of said concentric surfaces of one of said annular channels so as to enable transmitting of said rotary drive motion from said drive input mechanism to said driven output mechanisms via said rotor and said rotary drive motion transmitting assemblies and also determine speed and direction of said transmitted rotary drive motion, said input element also adapted to be moved to an intermediate neutral position located between said displaced drive positions in which said input element is disposed between and spaced from said inner and outer concentric surfaces of said one of said annular channels of said rotor so as to disable the transmitting of said rotary drive motion from said drive input mechanism to said driven output mechanisms via said rotor and said rotary drive motion transmitting assemblies; and (f) means mounted to said support structure for controlling movement of said input elements of said rotary drive motion transmitting assemblies independently of one another between said displaced drive positions and said intermediate neutral position.

6. The system of claim 5 wherein each of said driven rotary output mechanisms includes:

at least one wheel; and an annular driven element mounted at an inner side of said wheel and drivingly coupled to said output element of one of said rotary drive motion transmitting assemblies.

7. The system of claim 6 wherein said output element of each of said rotary drive motion transmitting assemblies is a first sprocket and said annular driven element of each of said driven rotary output mechanisms is a second sprocket drivingly coupled to said first sprocket by an endless drive chain.

8. The system of claim 6 wherein said output element of each of said rotary drive motion transmitting assemblies is a first spur gear and said annular driven element of each of said driven rotary output mechanisms is a second spur gear drivingly meshing directly with said first spur gear.

9. The system of claim 5 wherein said support structure is a chassis of a vehicle having a pair of opposite lateral sides.

10. The system of claim 9 wherein each of said driven rotary output mechanisms includes a set of front, rear and center track wheels aligned with one another and rotatably mounted in a spaced apart relationship from one another along a respective one of said opposite lateral sides of said chassis.

11. The system of claim 10 wherein each of said driven rotary output mechanisms further includes a pair of endless flexible members separately coupling said front and rear wheels of said set with said center wheel of said set so as to provide all wheel drive of the vehicle.

12. The system of claim 10 wherein each of said driven rotary output mechanisms further includes an endless track entrained about said set of front, rear and center wheels along said respective one of said opposite lateral sides of said chassis, said endless track including a plurality of cleats and at least one endless elastic member extending through said cleats so as to hold said cleats together so as to form said endless track.

13. The system of claim 5 wherein each of said rotary drive motion transmitting assemblies further has a cross shaft mounted to said support structure to rotate in either one of said first and second opposite directions and having opposite ends with said output and input elements mounted to said cross shaft at said respective opposite ends thereof for undergoing rotation with said cross shaft.

14. The system of claim 13 wherein each of said rotary drive motion transmitting assemblies further has a spherical bearing rotatably and pivotally supporting said cross shaft adjacent to said outer end thereof so as to allow pivotal movement of said cross shaft relative to said spherical bearing and thereby movement of said input element relative to said rotor between said opposite drive positions.

15. The system of claim 5 wherein said input element of each of said rotary drive motion transmitting assemblies is a roller for making frictional engagement with said surfaces of said annular groove when at either one of said opposite drive positions.

16. A bi-lateral track drive vehicle, comprising:
  (a) a chassis having a seat for a driver and opposite lateral sides;
  (b) a pair of bi-lateral drive traction mechanisms respectively movably supported along said opposite lateral sides of said chassis, each of said drive traction mechanisms having a set of front, rear and center wheels all rotatably mounted to said chassis such that said sets of wheels along said opposite lateral sides are aligned with one another, said drive traction mechanisms also having a pair of endless tracks respectively entrained about said sets of wheels and a pair of annular driven elements aligned with one another mounted at inner sides of a corresponding pair of said wheels of said sets thereof at said opposite lateral sides of said chassis;
  (c) a rotor mounted to said chassis to rotate in either one of first and second opposite directions and disposed between and spaced from said bi-lateral drive traction mechanisms, said rotor having a pair of opposite sides and a pair of annular channels each defined on one of said opposite sides of said rotor, each of said channels having opposing inner and outer concentric surfaces radially spaced from one another such that said outer surface has a diameter larger than a diameter of said inner surface;
  (d) a drive input mechanism operable for transmitting rotary drive motion to said rotor so as to cause said rotor to rotate in either one of said first and second opposite directions, said drive input mechanism including,
    (i) a set of rotary pedals rotatably mounted on said chassis rearwardly of said rotor and forwardly of said seat and adapted to be manually rotated by the driver so as to generate said rotary drive motion in either one of said opposite first and second directions, and
    (ii) means drivingly coupling said set of rotary pedals to said rotor for transmitting said rotary drive motion of said set of rotary pedals to said rotor;
  (e) a pair of rotary drive motion transmitting assemblies each mounted to said chassis to rotate in either one of said first and second opposite directions and disposed in a transverse relationship to and extending between said rotor and said bi-lateral drive traction mechanisms, each of said rotary drive motion transmitting assemblies having output and input ends, said output end of each of said rotary drive motion transmitting assemblies being coupled to said annular driven element of one of said bi-lateral drive traction mechanisms, said input end of each of said rotary drive motion transmitting assemblies being disposed at one of said opposite sides of said rotor and adapted to be moved to one of a pair of displaced drive positions wherein said input end engages one of said concentric surfaces and is disengaged from the other of said concentric surfaces of one of said annular channels so as to enable transmission of said rotary drive motion from said input drive mechanism to said bi-lateral drive traction mechanism via said rotor and said rotary drive motion transmitting assemblies and also determine speed and direction of said rotary drive motion, said input end of each of said rotary drive motion transmitting assemblies also adapted to be moved to an intermediate neutral position located between said displaced drive positions in which said input end is disposed between and spaced from said inner and outer concentric surfaces of said one of said annular channels of said rotor so as to disable said transmission of said rotary drive motion from said input drive mechanism to said bi-lateral drive traction mechanism via said rotor and said rotary drive motion transmitting assemblies; and
  (f) a pair of hand-operated levers pivotally mounted to said chassis adjacent to said seat and said set of pedals, each of levers being independently movable between forward and rearward positions and an intermediate neutral position therebetween and linked to a respective one of said rotary drive motion transmitting assemblies between said output and input ends thereof so as to shift said input end of said respective one of said rotary drive motion transmitting assemblies correspondingly between said opposite drive positions and said intermediate neutral position of said one of said rotary drive motion transmitting assemblies such that
    (i) at said intermediate neutral positions of said levers said input ends of said rotary drive motion transmitting assemblies are at said intermediate neutral positions of said input ends so as to not contact either of said inner and outer concentric surfaces of said respective grooves on said rotor so that rotation of said set of pedals in either direction does not cause transmission of said rotary drive motion to said bi-lateral drive traction mechanisms,
    (ii) at one of said forward and rearward positions of said levers said input ends of said rotary drive motion transmitting assemblies are at one of said displaced drive positions of said input ends so as to engage said inner concentric surfaces of said respective grooves on said rotor so that pedaling rotation of said set of pedals in either direction causes transmission of said rotary drive motion at a higher gear ratio in the direction of said pedaling rotation, and
    (iii) at the other of said forward and rearward positions of said levers said input ends of said rotary drive motion transmitting assemblies are at the other of said displaced drive positions of said input ends so as to engage said outer concentric surfaces of said respective grooves on said rotor so that pedaling rotation of said set of pedals in either direction causes transmission of said rotary drive motion at a lower gear ratio in the direction of said pedaling rotation.

17. The vehicle of claim 16 wherein differential movement of said levers relative to one another causes turning in either direction based on said respective positions of said levers and direction of pedaling rotation of said set of pedals.

18. The vehicle of claim 16 wherein each of said bi-lateral drive traction mechanisms further includes a pair of endless flexible members separately coupling said front and rear wheels of said set with said center wheel of said set so as to provide all wheel drive of the vehicle.

19. The vehicle of claim 16 wherein said endless track of each of said bi-lateral drive traction mechanisms includes a plurality of cleats and at least one endless elastic member extending through said cleats so as to hold said cleats together so as to form said endless track.

20. The vehicle of claim 16 wherein each of said rotary drive motion transmitting assemblies further has a cross shaft mounted to rotate in either one of said first and second opposite directions and having opposite ends, said output and input ends of each of said rotary drive motion transmitting assemblies being output and input elements mounted to said cross shaft at said respective opposite ends thereof for undergoing rotation with said cross shaft.

21. The vehicle of claim 20 wherein each of said rotary drive motion transmitting assemblies further has a spherical bearing being mounted to said chassis so as to rotatably and pivotally support said cross shaft adjacent to said outer end thereof and allow pivotal movement of said cross shaft relative to said spherical bearing and thereby movement of said input element relative to said rotor between said displaced drive positions.

22. The vehicle of claim 20 wherein said input element of each of said rotary drive motion transmitting assemblies is a roller for making frictional engagement with said surfaces of said annular groove.

23. The vehicle of claim 20 wherein said output element of each of said rotary drive motion transmitting assemblies is a first sprocket and said annular driven element of each of said bi-lateral drive traction mechanisms is a second sprocket drivingly coupled to said first sprocket by an endless drive chain.

24. The vehicle of claim 20 wherein said output element of each of said rotary drive motion transmitting assemblies is a first spur gear and said annular driven element of each of said bi-lateral drive traction mechanisms is a second spur gear drivingly meshing directly with said first spur gear.

\* \* \* \* \*